(12) United States Patent
Nonomura et al.

(10) Patent No.: US 9,707,851 B2
(45) Date of Patent: Jul. 18, 2017

(54) POWER SUPPLY SYSTEM CONFIGURED BY INDIVIDUALLY CONNECTING ELECTRIC STORAGE DEVICES TO A COMMON OBJECT TO BE SUPPLIED WITH POWER OR A COMMON CHARGING APPARATUS

(71) Applicant: DENSO CORPORATION, Kariya, Aichi-pref. (JP)

(72) Inventors: Tomomi Nonomura, Anjo (JP); Hiroki Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 14/640,131

(22) Filed: Mar. 6, 2015

(65) Prior Publication Data
US 2015/0251547 A1 Sep. 10, 2015

(30) Foreign Application Priority Data
Mar. 6, 2014 (JP) .................................. 2014-044099

(51) Int. Cl.
*H02J 7/00* (2006.01)
*B60L 11/18* (2006.01)

(52) U.S. Cl.
CPC ....... *B60L 11/1816* (2013.01); *B60L 11/1842* (2013.01); *B60L 11/1862* (2013.01);
(Continued)

(58) Field of Classification Search
CPC .............. B60L 11/1809; B60L 11/1816; B60L 11/1842; B60L 11/1862; H02J 7/0013; H02J 7/007
(Continued)

(56) References Cited

U.S. PATENT DOCUMENTS

2010/0096918 A1* 4/2010 Sawada ................. B60L 11/123
307/9.1

FOREIGN PATENT DOCUMENTS

| JP | 2008-109840 | 5/2008 |
|---|---|---|
| JP | 2008-236902 | 10/2008 |

(Continued)

OTHER PUBLICATIONS

Machine Traslation of JP2012175770 performed on JPO website on Aug. 20, 2016, 9 pages.*
(Continued)

*Primary Examiner* — Nathaniel Pelton
(74) *Attorney, Agent, or Firm* — Nixon & Vanderhye PC

(57) ABSTRACT

A power supply system is provided. For storage devices, upper limit powers are determined. A control unit includes a target power acquiring section which acquires power requested by an object or power supplied by a charging apparatus as target power of charge/discharge performed by storage devices. A residual capacity acquiring section acquires residual capacities of the storage devices. A first target power allocating section allocates the target power to the storage devices as charge/discharge powers based on the residual capacities. A determining section determines whether or not the allocated charge/discharge powers exceed the upper limit powers of the storage devices. A second target power allocating section reallocates the target power to the storage devices so that the allocated charge/discharge powers do not exceed the upper limit powers, when the determining section determines that any of the charge/discharge powers has exceeded the upper limit power of the related storage device.

2 Claims, 5 Drawing Sheets

(52) U.S. Cl.
CPC ............ *H02J 7/007* (2013.01); *H02J 7/0013* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC ........................................................ 320/109
See application file for complete search history.

(56) References Cited

FOREIGN PATENT DOCUMENTS

| | | |
|---|---|---|
| JP | 2008-2368902 | 10/2008 |
| JP | 2009-278754 | 11/2009 |
| JP | 2010-233287 | 10/2010 |
| JP | 2012-175770 | 9/2012 |
| JP | 2012175770 | * 10/2012 |

OTHER PUBLICATIONS

Office Action (4 pgs.) dated Feb. 9, 2016 issued in corresponding Japanese Application No. 2014-044099 with an at least partial English language translation (3 pgs.).

* cited by examiner

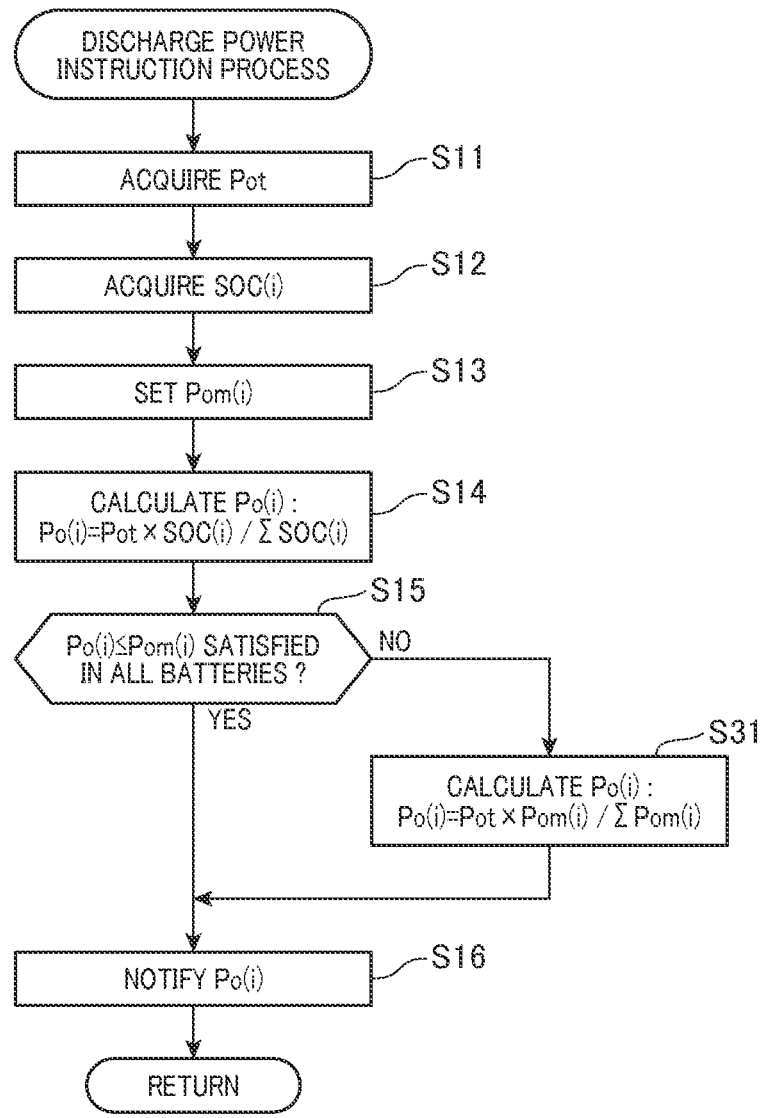

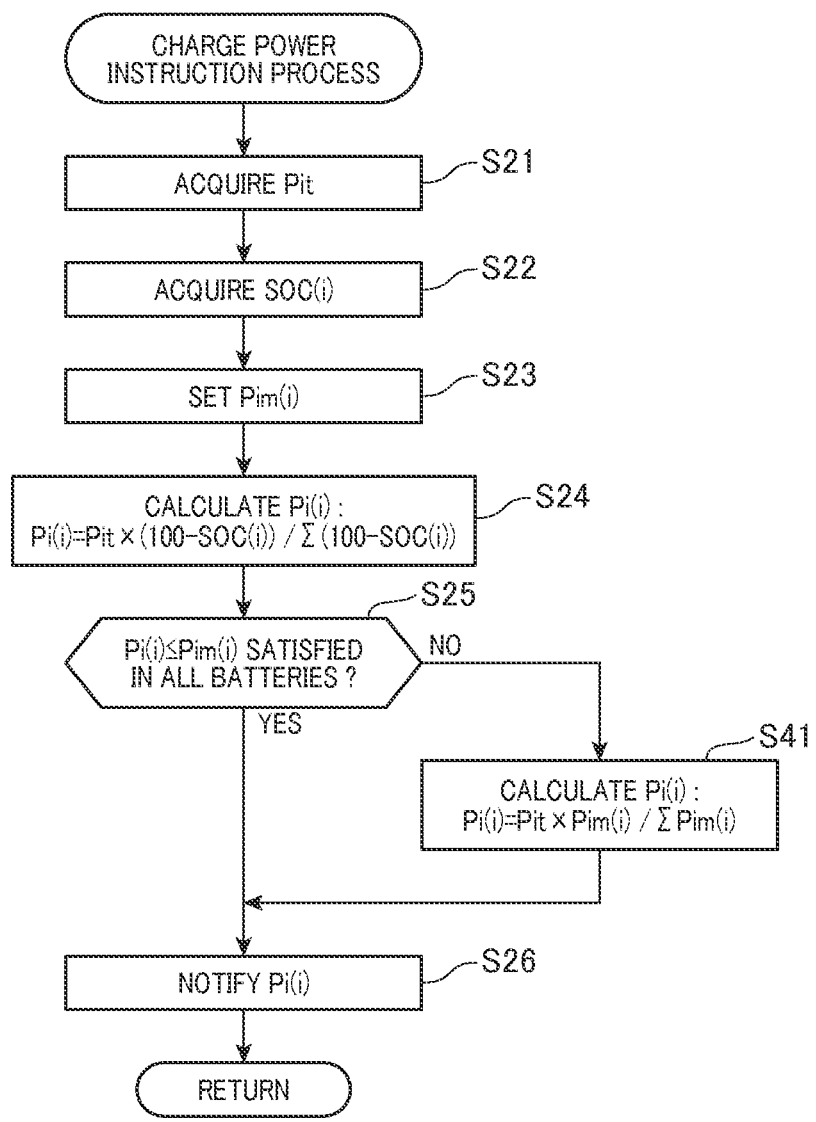

POWER SUPPLY SYSTEM CONFIGURED BY INDIVIDUALLY CONNECTING ELECTRIC STORAGE DEVICES TO A COMMON OBJECT TO BE SUPPLIED WITH POWER OR A COMMON CHARGING APPARATUS

CROSS-REFERENCE TO RELATED APPLICATION

This application is based on and claims the benefit of priority from earlier Japanese Patent Application No. 2014-044099 filed Mar. 6, 2014, the description of which is incorporated herein by reference.

BACKGROUND

Technical Field

The present invention relates to a power supply system which is configured by individually connecting a plurality of electric storage devices to a common object to be supplied with power or a common charging apparatus.

Related Art

For example, in charging an electric storage device mounted to an electric vehicle or a plug-in hybrid vehicle, a commercial power source is connected to the electric storage device. In addition to such a usage, the electric storage device mounted such as to an electric vehicle is proposed to be used as a power-supply facility for a residential house.

Proliferation such as of electric vehicles can bring about a situation where the in-vehicle power sources of a plurality of electric vehicles are connected to a common charging apparatus, and these in-vehicle power sources are concurrently charged. Further, there can be a situation where the in-vehicle power sources of a plurality of electric vehicles are used as power-source facilities of a common electrical load, for concurrent discharge of power to the electrical load.

In a situation where the in-vehicle power sources of a plurality of electric vehicles are connected to a common charging apparatus, power supply to the individual in-vehicle power sources from the charging apparatus is required to be appropriately administered. Further, in a situation where the in-vehicle power sources of a plurality of electric vehicles are connected to a common electrical load, power supply from the individual in-vehicle power sources to the electrical load is required to be appropriately administered. For example, in a known power supply system as disclosed in JP-A-2008-236902, electric power is controlled in a situation where the in-vehicle power sources of a plurality of electric vehicles are connected to a common electrical load.

According to the technique described in JP-A-2008-236902, in discharging electric power to the electrical load from the individual in-vehicle power sources, a state of charge (SOC) of each of the in-vehicle power sources is acquired, and then an allocation of discharge power for the in-vehicle power source is determined on the basis of the mutual rate of the SOCs of the in-vehicle power sources. Determining an allocation of discharge power for each in-vehicle power source in this way can avoid a situation where any one of the in-vehicle power sources is disabled from power discharge earlier than other in-vehicle power sources. The same applies to a situation where a plurality of in-vehicle power sources are connected to a common charging apparatus and power is supplied from the charging apparatus to the individual in-vehicle power sources. In this situation, determining an allocation of charge power for each in-vehicle power source can avoid a situation where any one of the storage devices is overcharged, or fully charged earlier than other storage devices.

In setting a discharge power on the basis of SOCs, the discharge power allocated to each in-vehicle power source at the time of discharge of the in-vehicle power sources could be set exceeding the power that can be discharged by the in-vehicle power source (upper limit discharge power). In this case, in the actual discharge, the in-vehicle power source in question can discharge only the upper limit discharge power. As a result, the power supplied to the electrical load becomes lower than the requested power, arousing a concern that the performance of the electrical load becomes unstable.

In setting a charge power on the basis of SOCs, the charge power allocated to each in-vehicle power source at the time of charge of the in-vehicle power sources could be set exceeding the power that can be charged by the in-vehicle power source (upper limit charge power). In this case, in the actual charge, the in-vehicle power source in question is charged with only the upper limit charge power. As a result, there is a concern that the power supplied from the charging apparatus becomes smaller than the originally expected power.

SUMMARY

An embodiment provides a power system that is able to appropriately perform charge or discharge of each of a plurality of storage devices when the charge or discharge is performed by connecting the plurality of storage devices in parallel.

An embodiment provides a power supply system, including: a plurality of storage devices which are connected in parallel to at least one of a common object to be supplied with power and a common charging apparatus; and a control unit which has at least one of a discharge control function for controlling discharge of power from the storage devices to the object, and a charge control function for controlling charge of power from the charging apparatus to the storage devices. For the storage devices, respective upper limit powers are determined which are upper limit values of charge/discharge power. The control unit includes: a target power acquiring section which acquires power requested by the object or power supplied by the charging apparatus as target power of charge/discharge performed by the storage devices; a residual capacity acquiring section which acquires residual capacities of the storage devices; a first target power allocating section which allocates the target power to the respective storage devices as charge/discharge powers on the basis of the residual capacities of the storage devices; a determining section which determines whether or not the charge/discharge powers allocated by the first target power allocating section to the respective storage devices exceed the upper limit powers of the storage devices; and a second target power allocating section which reallocates the target power to the respective storage devices so that the charge/discharge powers allocated by the first target power allocating section to the respective storage devices do not exceed the upper limit powers, when the determining section determines that any of the charge/discharge powers allocated by the first target power allocating section to the respective storage devices has exceeded the upper limit power of the storage device related to the any of the charge/discharge powers.

BRIEF DESCRIPTION OF THE DRAWINGS

In the accompanying drawings:

FIG. 4 is a flow diagram illustrating a discharge power instruction process, according to a second embodiment; and FIG. 5 is a flow diagram illustrating a charge power instruction process, according to the second embodiment.

DETAILED DESCRIPTION OF THE PREFERRED EMBODIMENTS

With reference to the accompanying drawings, hereinafter are described some embodiments of the present invention.

(First Embodiment)

Figure 1:
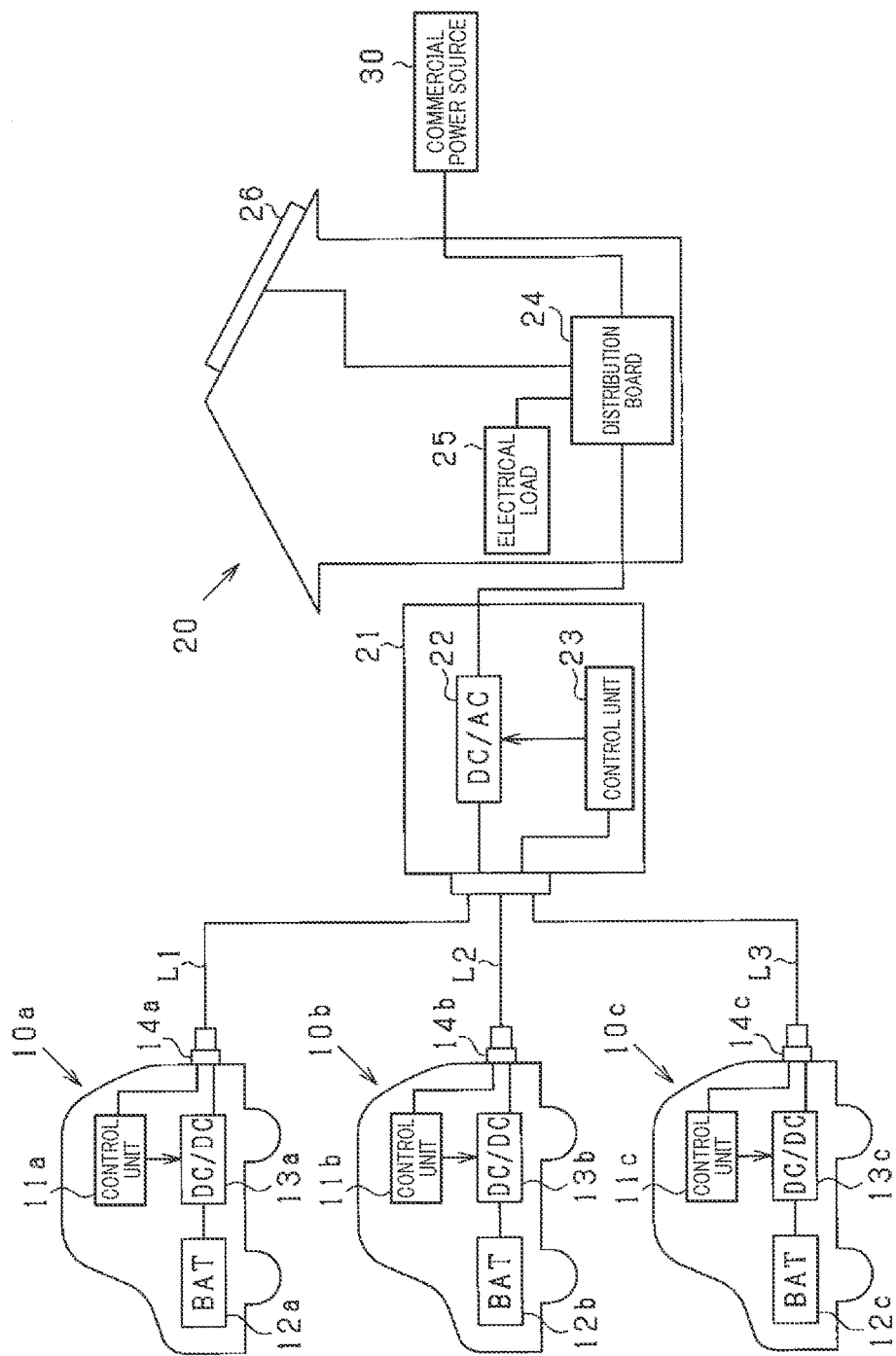
FIG. 1 is a diagram illustrating a system configuration, according to a first embodiment.

FIG. 1 shows a system configuration diagram according to the first embodiment. As shown in FIG. 1, a residential house 20 is provided with a charge/discharge station 21 which is connected to vehicles, such as electric vehicles or plug-in hybrid vehicles. Being connected to the vehicles, the charge/discharge station 21 serves as a charging apparatus which charges power to each of the in-vehicle batteries incorporated in the respective vehicles, the apparatus being common to the in-vehicle batteries. Further, being connected to the vehicles, the charge/discharge station 21 is capable of discharging power to an electrical load 25 that is an object to be supplied with power from the in-vehicle batteries of the respective vehicles, the object being common to the in-vehicle batteries.

The charge/discharge station 21 can be concurrently connected to a plurality of vehicles. Being concurrently connected to a plurality of vehicles, the charge/discharge station 21 is capable of concurrently charging power to the in-vehicle batteries incorporated in the plurality of vehicles, and is also capable of allowing the in-vehicle batteries to concurrently discharge power to the electrical load 25. In FIG. 1, three vehicles 10a, 10b and 10c (plug-in hybrid vehicles) (hereinafter referred to as vehicles 10a to 10c) are connected to the charge/discharge station 21 of the residential house 20.

The vehicles 10a to 10c are respectively provided with control units 11a, 11b and 11c (hereinafter referred to as control units 11a to 11c), batteries 12a to 12c (hereinafter referred to as batteries 12a to 12c), power converters 13a, 13b and 13c (hereinafter referred to as power converters 13a to 13c), and inlets 14a, 14b and 14c (hereinafter referred to as inlets 14a to 14c). When the vehicles 10a to 10c are connected to the charge/discharge station 21 via the inlets 14a to 14c, respectively, the respective batteries 12a to 12c can be charged. The rotational energy of an internal combustion engine is converted into electric power by a generator, and the converted power can be charged to the batteries 12a to 12c. Further, by being connected to the charge/discharge station 21, the vehicles 10a to 10c are able to supply power to the electrical load 25 from the batteries 12a to 12c, respectively.

The batteries 12a to 12c are lithium ion batteries and the full-charge capacities of the respective batteries 12a to 12c are equal to each other. It should be noted that the batteries may be different batteries, such as lead batteries.

The control units 11a to 11c control the power converters 13a to 13c, respectively, to charge/discharge power to/from the batteries 12a to 12c, respectively. The inlets 14a to 14c are detachably connected to the charge/discharge station 21 via charge/discharge paths L1, L2 and L3 (hereinafter referred to as charge/discharge paths L1 to L3), respectively. At the time of charge/discharge in the batteries 12a to 12c, the control units 11a to 11c mutually communicate via the respective charge/discharge paths L1 to L3. Through the mutual communication between the control units 11a to 11c, the power system sets one of the control units 11a to 11c as a master that has control over the charge/discharge of the batteries 12a to 12c. The power system also sets the remaining control units as slaves that have control over the charge/discharge of the batteries 12a to 12c according to the instructions from the master.

In the present embodiment, the control unit 11a of the vehicle 10a which is firstly connected to the charge/discharge station 21 is set as a master, and the control units 11b and 11c of the remaining vehicles 10b and 10c, respectively, are set as slaves. The control unit 11a as a master has a discharge control function for controlling discharge of power to the electrical load 25, and a charge control function for controlling charge of power to the batteries 12a to 12c.

The power converters 13a to 13c, which are known two-way DC/DC converters, step up the DC power supplied from the charge/discharge station 21, and output the stepped up DC power to the batteries 12a to 12c, respectively, to thereby charge the batteries 12a to 12c. Further, the power converters 13a to 13c step down the output voltages of the batteries 12a to 12c, respectively, and output the stepped down DC power to the charge/discharge station 21. The power converters 13a to 13c may be configured to step down the DC power supplied from the charge/discharge station 21 and output the stepped down DC power to the batteries 12a to 12c, respectively. Further, the power converters 13a to 13c may be configured to step up the output voltages of the batteries 12a to 12c, respectively, and output DC power to the charge/discharge station 21.

The residential house 20 is provided with the charge/discharge station 21, a distribution board 24, the electrical load 25, and a solar power generator 26. The distribution board 24 is connected to the charge/discharge station 21, the electrical load 25, the solar power generator 26, and a commercial power source 30. Transmission/reception of AC power having a frequency of 60 Hz and a voltage of 100 V is performed between the distribution board 24 and, the charge/discharge station 21, the electrical load 25, the solar power generator 26 and the commercial power source 30.

The charge/discharge station 21 includes a two-way DC/AC converter 22. The charge/discharge station 21 connects each of the power converters 13a to 13c in parallel with the solar power generator 26 and the commercial power source 30, so that the AC power supplied from the solar power generator 26 and the commercial power source 30 is converted to DC power for the charge of the batteries 12a to 12c.

Further, the charge/discharge station 21 connects each of the power converters 13a to 13c in parallel with the electrical load 25, so that the DC power supplied from the batteries 12a to 12c is converted to AC power to have the individual batteries 12a to 12c discharge power to the electrical load 25. The electrical load 25 herein collectively represents the lighting equipment and the home electric appliances provided inside the residential house 20. The electrical load 25 is activated upon supply of AC power via the distribution board 24.

The charge/discharge station 21 includes a control unit 23. The control unit 23 controls the two-way DC/AC converter 22. Specifically, under the control, the DC power supplied from the batteries 12a to 12c is converted to AC power by the two-way DC/AC converter 22 such that the converted AC power has the same phase and frequency as those of the AC power supplied from the commercial power source 30.

The control unit 23 is connected to the control units 11a to 11c via the respective charge/discharge paths L1 to L3 so as to be able to communicate with the control units 11a to 11c. When power is supplied from the batteries 12a to 12c to the electrical load 25, the control unit 23 calculates a request power Pot which is requested to the batteries 12a to 12c by the electrical load 25. The request power Pot of the electrical load 25 is calculated as a value obtained by subtracting the sum of the power supplied from the commercial power source 30 and the power supplied from the solar power generator 26, from the consumed power of the electrical load 25. The request power Pot is notified to the control unit 11a that is a master of the control units 11a to 11c.

The control unit 11a allocates the request power Pot, which has been acquired as a target power from the control unit 23, to the power converters 13a to 13c to calculate respective discharge power command values Po based on which power should be outputted to the charge/discharge station 21. Then, the discharge power command values Po are notified to the respective control units 11a to 11c. It should be noted that the discharge power command value Po in an i-th battery is expressed ty Po(i) (i=1, 2 or 3).

At the time of discharge, the control units 11a to 11c control the respective power converters 13a to 13c to discharge power according to the discharge power command values Po to the charge/discharge station 21. Specifically, the control units 11a to 11c adjust the currents passed from the power converters 13a to 13c to the respective charge/discharge paths L1 to L3 so as to have predetermined current values to thereby output power according to the discharge power command values Po.

The present embodiment is configured such that, in allocating the request power Pot of the electrical load 25 to the power converters 13a to 13c, the discharge power command values Po are calculated on the basis of the residual capacities of the batteries 12a to 12c acquired from the respective control units 11a to 11c. The full-charge capacities of the respective batteries 12a to 12c used herein are equal to each other. Accordingly, the SOCs of the batteries 12a to 12c are regarded to be the residual capacities of the batteries, and thus the discharge power command values Po are calculated on the basis of the SOCs. Specifically, the discharge command values Po are calculated such that the request power Pot is allocated on the basis of the mutual rate of the SOCs of the batteries.

Let us take as an example the case where the 1st battery 12a has a SOC of 80%, the 2nd battery 12b has a SOC of 50%, and the 3rd battery 12c has a SOC of 30%, at the start of discharge, and where the full-charge capacity of each of the batteries 12a to 12c is 100 Wh.

In this example, an upper limit value of discharge power (upper limit discharge power) Pom is set to each of the batteries 12a to 12c. The upper limit discharge power Pom of an i-th battery is expressed by Pom(i) (i=1, 2 or 3). Further, in this example, the upper limit discharge power Pom(1) of the 1st battery 12a is 100 W, the upper limit discharge power Pom(2) of the 2nd battery 12b is 100 W, and the upper limit discharge power Pom(3) of the 3rd battery 12c is 60 W.

In this example, the request power Pot of the electrical load 25 is 160 W, under the condition of which the discharge power command values Po are allocated according to the SOCs of the batteries 12a to 12c. In this case, the discharge power command value Po(1) of the 1st battery 12a is set to 80 W, the discharge power command value Po(2) of the 2nd battery 12b is set to 50 W, and the discharge power command value Po(3) of the 3rd battery 12c is set to 30 W. When the discharge power command values Po are set on the basis of the SOCs, the SOCs of the batteries 12a to 12c one hour later each become 0%. Allocation of the discharge power commands Po to the batteries 12a to 12c in this way can elongate the durations of discharge of the batteries 12a to 12c, and further can elongate the durations in which power can be supplied to the electrical load 25 from the batteries 12a to 12c. Further, the batteries 12a to 12c having an equal duration of discharge can prevent the occurrence of a situation where only a part of the batteries 12a to 12c has to discharge power, and the part of the battery(ies) is deteriorated compared to other battery(ies).

When the request power Pot of the electrical load 25 is 220 W and discharge power is allocated according to the SOCs of the batteries 12a to 12c, the discharge power of the 1st battery 12a is set to 110 W, the discharge power of the 2nd battery 12b is set to about 69 W, and the discharge power of the 3rd battery 12c is set to about 41 W. In this case, the discharge power (110 W) set for the 1st battery 12a is more than the upper limit discharge power Pom(1) (100 W) of the 1st battery 12a. Accordingly, the power actually discharged to the electrical load 25 from the 1st battery 12a is equivalent to the upper limit discharge power of 100 W. In other words, the total discharge power supplied from the batteries 12a to 12c is 210 W which does not satisfy the request power Pot of 220 W of the electrical load 25. Therefore, there is a concern that the performance of the electrical load 25 becomes unstable.

The present embodiment copes with the case where any one of the discharge power command values Po set for the batteries 12a to 12c on the basis of the SOCs exceeds the upper limit discharge power Pom. Specifically, in this case, the discharge power command value Po of the battery 12a to 12c in question is ensured to be reset to the upper limit discharge power Pom of the battery 12a to 12c. For example, in the situation mentioned above, the discharge power command value Po(1) of the 1st battery 12a is reset to an upper limit discharge power Pom(1) (100 W).

Then, the 2nd and 3rd batteries 12b and 12c are allocated with the remaining power (120 W) which is obtained by subtracting the value (100 W) that has been reset as the discharge power command value Po(1) of the 1st battery 12a from the request power Pot (220 W). Specifically, the remaining power (120 W) is allocated to the 2nd and 3rd batteries 12b and 12c according to the mutual rate of the SOCs of the batteries 12b and 12c to thereby set the discharge power command value Po(2) of the 2nd battery 12b to 75 W and the discharge power command value Po(3) of the 3rd battery 12c to 45 W. The setting of the discharge power commands Po in this way ensures supply of the request power Pot from the batteries 12a to 12c. When power supply to the electrical load 25 is kept with this setting, the SOCs of both of the 2nd and 3rd batteries 12b and 12c turn to 0% forty minutes later. In other words, the durations of discharge of the 2nd and 3rd batteries 12b and 12c are equalized.

Figure 2:
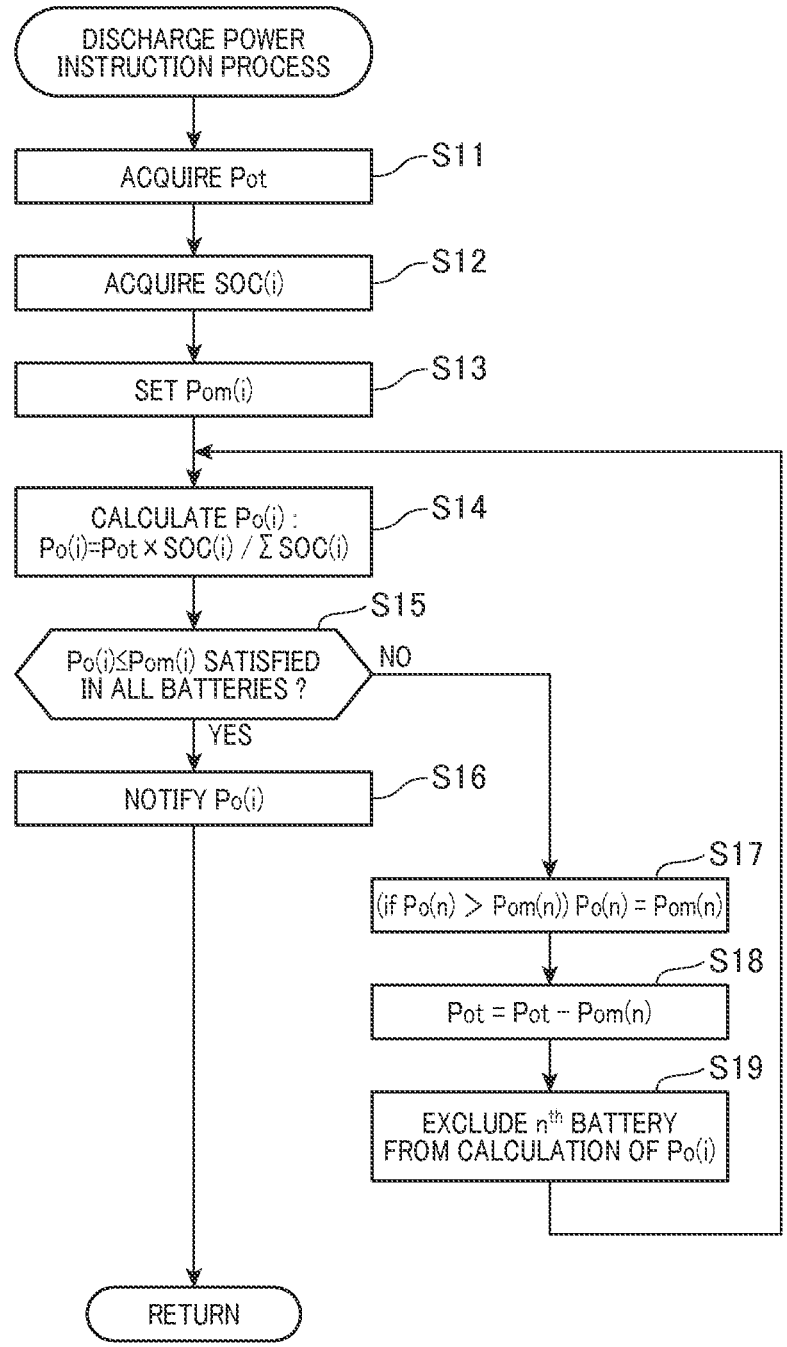
FIG. 2 is a flow diagram illustrating a discharge power instruction process, according to the first embodiment.

FIG. 2 is a flow diagram illustrating a discharge power instruction process. The present process is performed by the control unit 11a at predetermined periods.

In step S11, the control unit 11a acquires the request power Pot of the electrical load 25 from the controller 23 and sets the request power Pot as a target discharge power for which the batteries 12a to 12c perform discharge. In step S12, the control unit 11a acquires the SOCs of the batteries 12a to 12c. The SOCs of the batteries 12a to 12c are calculated by means of a known method by the respective control units 11a to 11c on the basis, for example, of the detection values of the voltage across the terminals of the respective batteries 12a to 12c and the detection values of the input/output currents of the batteries 12a to 12c.

In step S13, the control unit 11a sets the upper limit discharge powers Pom calculated for the respective batteries 12a to 12c. The upper discharge powers Pom of the power converters 13a to 13c rely on the residual capacities, the temperatures, and the like of the batteries 12a to 12c, and also rely on the conversion efficiencies, the output characteristics, the temperatures, and the like of the power converters 13a to 13c. The control units 11a to 11c calculate the upper limit discharge powers Pom of the respective batteries 12a to 12c at predetermined periods on the basis of the residual capacities and the temperatures of the batteries 12a to 12c, and the conversion efficiencies, the output characteristics, the temperatures, and the like of the power converters 13a to 13c. It should be noted that the control unit 11a, which is a master, may calculate the upper limit discharge powers Pom of all of the batteries 12a to 12c.

In step S14, the discharge power command values Po are calculated for the batteries 12a to 12c. The discharge power command values Po are calculated as values resulting from the allocation of the request power Pot on the basis of the SOCs of the batteries 12a to 12c. Specifically, the control unit 11a calculates the sum (ΣSOC(i)) of the SOCs(i) of the batteries 12a to 12c, and then divides the SOC(i) of each of the batteries 12a to 12c by the sum ΣSOC(i). Then, the control unit 11a multiplies the division value by the request power Pot, thereby obtaining the multiplied value as the discharge power command value Po(i) (Po(i)=Pot×SOC(i)/ΣSOC(i)).

In step S15, the control unit 11a determines whether each discharge power command value Po(i) is not more than the upper limit discharge power Pom(i) of the corresponding battery. If the discharge power command values Po of all of the batteries 12a to 12c are not more than the respective upper limit discharge powers Pom (YES in step S15), the control proceeds to step S16. In step S16, the discharge power command values Po are notified to the respective control units 11a to 11c and then the process is halted.

If the discharge power command value Po calculated on the basis of the SOC exceeds the upper limit discharge power Pom in any one of the batteries (NO in step S15), the control proceeds to step S17. In step S17, the discharge power command value Po(n) of the battery in question (n-th battery) is newly set to an upper limit discharge power Pom(n). Then, in step S18, the upper limit discharge power Pom(n) set as the discharge power command value Po(n) in step S17 is subtracted from the request power Pot. Then, in step S19, the n-th battery is excluded from the objects for which the discharge power command values Po are calculated on the basis of the SOCs. Then, in step S14, the request power Pot is allocated to the batteries remained after exclusion of the n-th battery, on the basis of the SOCs of the remaining batteries to thereby newly calculate the discharge power command values Po.

The processing in step S11 corresponds to a target power acquiring means (section), the processing in step S12 corresponds to a residual capacity acquiring means (section), the processing in step S13 corresponds to an upper limit power setting means (section), the processing in step 14 corresponds to a first target power allocating means (section), and the processing in step S15 corresponds to a determining means (section). Further, the processing in steps S17 to S19 and the processing in step S14 after step S19 correspond to a second target power allocating means (section).

In the present embodiment, when power is charged to the batteries 12a to 12c from the charge/discharge station 21, the control unit 23 notifies the control unit 11a, which is a master of the control units 11a to 11c, of a supply power Pit that can be outputted from the charge/discharge station 21.

The control unit 11a allocates the supply power Pit, which has been acquired as a target power, to the power converters 13a to 13c, thereby calculating charge power command values Pi to be outputted to the respective batteries 12a to 12c. Then, the charge power command values Pi are notified to the respective control units 11a to 11c. It should be noted that the charge power command value Pi for an i-th battery is expressed by Pi(i) (i=1, 2 or 3).

During charge, each of the control units 11a to 11c controls corresponding one of the power converters 13a to 13c, so that a power according to the charge power command value Pi is outputted to corresponding one of the batteries 12a to 12c. Specifically, the currents passed from the power converters 13a to 13c to the respective batteries 12a to 12c are adjusted so as to be equivalent to respective predetermined current values, thereby outputting powers according to the charge power command values Pi.

In allocating the supply power Pit supplied from the charge/discharge station 21 to the power converters 13a to 13c, each charge power command value Pi is ensured to be calculated on the basis of corresponding one of the residual capacities of the batteries 12a to 12c acquired from the respective control units 11a to 11c. Similar to the case of discharge, the SOCs of the batteries 12a to 12c are regarded as being the residual capacities of the respective batteries, and thus the charge power command values Pi are calculated on the basis of the SOCs. Specifically, the charge power command values Pi are calculated so that the supply power Pit is allocated on the basis of the mutual rate of values of the batteries, the values each being obtained by subtracting SOC from 100%.

Let us take as an example a case where the SOC of the 1st battery 12a is 20%, the SOC of the 2nd battery 12b is 40%, and the SOC of the 3rd battery 12c is 80%, and where the full charge capacity of each of the batteries 12a to 12c is 100 Wh.

Further, in the example, the batteries 12a to 12c are each provided with an upper limit value (upper limit charge power) Pim of charge power. It should be noted that the upper limit charge power Pim of an i-th battery is expressed by Pim(i) (i=1, 2 or 3). In the example, the upper limit charge power Pim(1) of the 1st battery 12a and the upper limit charge power Pim(2) of the 2nd battery 12b are each 100 W, and the upper limit charge power Pim(3) of the 3rd battery 12c is 60 W.

In the example, the supply power Pit supplied from the charge/discharge station 21 is 160 W, under the condition of which the charge power command values Pi are allocated according to the SOCs of the respective batteries 12a to 12c. As a result, the charge power command value Pi(1) of the 1st battery 12a is set to 80 W, the charge power command value Pi(2) of the 2nd battery 12b is set to 60 W, and the charge power command value Pi(3) of the 3rd battery 12c is set to 20 W. When the charge powers are set on the basis of the SOCs, the SOCs of the respective batteries 12a to 12c turn to 100% one hour later. Allocation of the charge power command values Pi in this way to the respective batteries 12a to 12c can equalize the opportunities of charge of the respective batteries 12a to 12c. By equalizing the opportunities of charge of the respective batteries, specific one of the batteries can be prevented from being deteriorated, and the duration of charge for the electrical load 25 can be shortened.

When the supply power Pit supplied from the charge/discharge station 21 is 220 W, and the charge power command values Pi are allocated according to the SOCs of the respective batteries 12a to 12c, the charge power command value Pi(1) of the 1st battery 12a is set to 110 W, the charge power command value Pi(2) of the 2nd battery 12b is set to 82.5 W, and the charge power command value Pi(3) of the 3rd battery 12c is set to 27.5 W. In this case, the charge power command value Pi(1)=110 W set for the 1st battery 12a is more than the upper limit charge power Pim(1)=100 W of the 1st battery 12a. Therefore, the power actually outputted to the 1st battery 12a is 100 W which is equivalent to the upper limit charge power Pim(1). In other words, the total charge power charged to the batteries 12a to 12c is 210 W which is smaller than the supply power Pit=220 W supplied from the charge/discharge station 21.

The present embodiment copes with a case where the charge power command value Pi which is set on the basis of the SOC exceeds the upper limit charge power Pim in any one of the batteries 12a to 12c. Specifically, in such a case, the charge power command value Pi of the battery in question is ensured to be reset to the upper limit charge power Pim of the battery. For example, in the situation mentioned above, the charge power command value Pi of the 1st battery 12a is reset to 100 W.

Then, the value (100 W) reset as the charge power command value Pi(1) of the 1st battery 12a is subtracted from the supply power Pit (220 W), followed by allocating the resultant value, i.e. the remaining power (120 W), to the 2nd and 3rd batteries 12b and 12c. Specifically, the remaining power (120 W) is allocated to the batteries 12b and 12c on the basis of the mutual rate of values of the batteries 12b and 12c, the values being each obtained by subtracting SOC from 100%. Then, the charge power command value Pi(2) of the 2nd battery 12b is set to 90 W, and the charge power command value Pi(3) of the 3rd battery 12c is set to 30 W. When power supply to the electrical load 25 is kept with this setting, the SOCs of both of the 2nd and 3rd batteries 12b and 12c turn to 100% forty minutes later. In other words, the durations of charge of the 2nd and 3rd batteries 12b and 12c are equalized.

Figure 3:
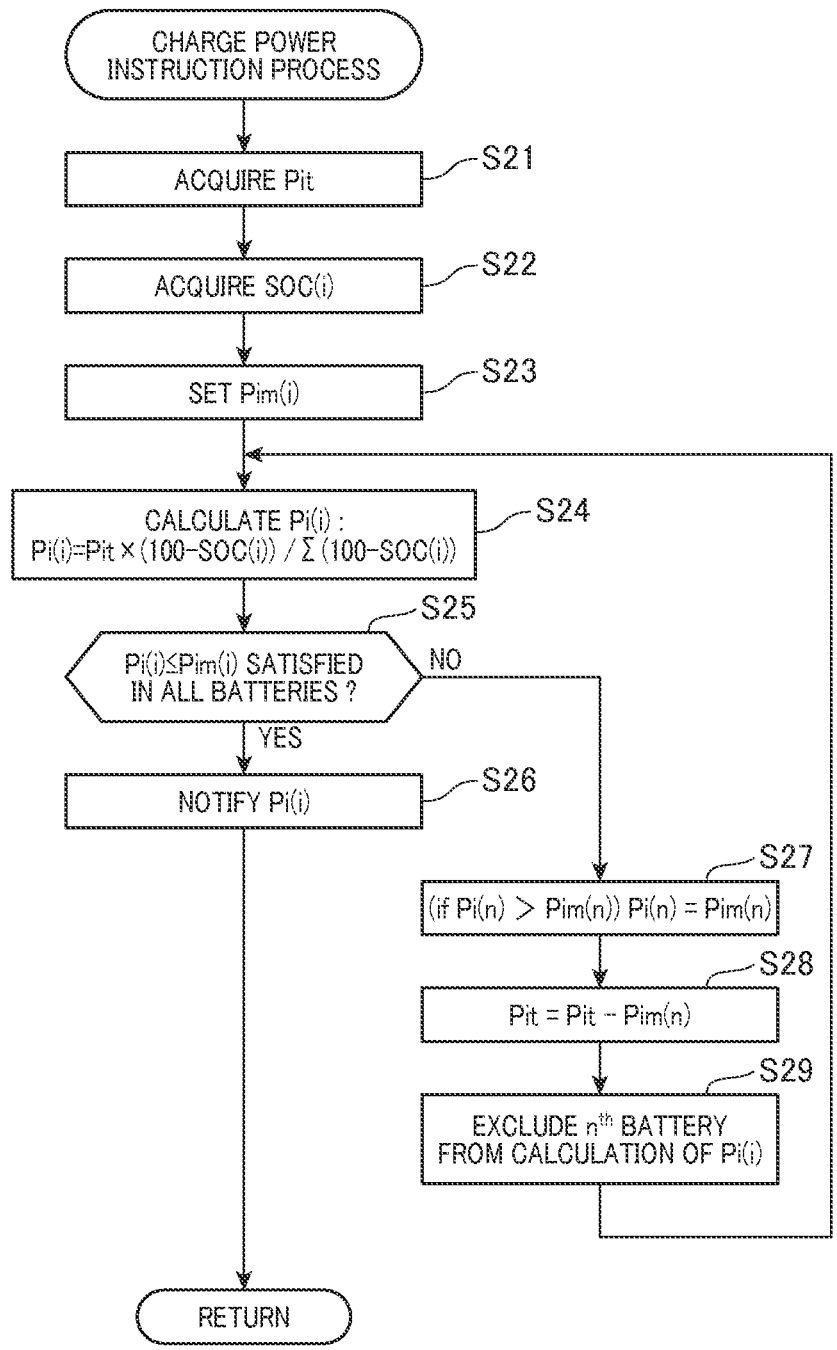
FIG. 3 is a flow diagram illustrating a charge power instruction process, according to the first embodiment.

FIG. 3 is a flow diagram illustrating a charge power instruction process of the present embodiment. The present process is performed by the control unit 11a at predetermined periods.

In step S21, the control unit 11a calculates the supply power Pit to be supplied from the charge/discharge station 21 and sets the calculated value as a target discharge power. In step S22, the SOCs of the respective batteries 12a to 12c are acquired.

In step S23, the control unit 11a sets the upper limit charge powers Pim calculated for the respective batteries 12a to 12c. The upper charge powers Pim of the power converters 13a to 13c rely on the residual capacities, the temperatures, and the like of the batteries 12a to 12c to which the respective power converters 13a to 13c are connected, and also rely on the conversion efficiencies, the output characteristics, the temperatures, and the like of the power converters 13a to 13c. The control units 11a to 11c calculate the upper limit charge powers Pim of the respective batteries 12a to 12c at predetermined periods on the basis of the residual capacities and the temperatures of the batteries 12a to 12c, and the conversion efficiencies, the output characteristics, the temperatures, and the like of the power converters 13a to 13c. It should be noted that the control unit 11a, which is a master, may calculate the upper limit charge powers Pim of all of the batteries 12a to 12c.

In step S24, the charge power command values Pi are calculated for the batteries 12a to 12c. The charge power command values Pi are calculated as values resulting from the allocation of the supply power Pit on the basis of the SOCs of the batteries 12a to 12c. Specifically, the control unit 11a calculates the sum (Σ(100-SOC(i))) of values which are each obtained by subtracting the SOC(i) of corresponding one of the batteries 12a to 12c from 100%, and then divides each of the values, which are each obtained by subtracting the SOC(i) of a corresponding one of the batteries 12a to 12c from 100%, by the sum (Σ(100-SOC(i))). Then, the control unit 11a multiplies the division value by the supply power Pit, thereby obtaining the multiplied value as the charge power command value Pi(i) (Pi(i)=Pit×(100-SOC(i))/Σ(100-SOC(i))).

In step S25, the control unit 11a determines whether or not each charge power command value Pi(i) is not more than the upper limit charge power Pim(i) of corresponding one of the batteries. If the charge power command values Pi of all of the batteries 12a to 12c are not more than the respective upper limit charge powers Pim (YES in step S25), control proceeds to step S26. In step S26, the charge power command values Pi are notified to the respective control units 11a to 11c and then the process is halted.

If the charge power command value Pi calculated based on the SOC exceeds the upper limit charge power Pim in any one of the batteries (NO in step S25), the control proceeds to step S27. In step S27, the charge power command value Pi(n) of the battery in question (n-th battery) is newly reset to an upper limit charge power Pim(n). Then, in step S28, the upper limit charge power Pim(n) set as the charge power command value Pi in step S27 is subtracted from the supply power Pit. Then, in step S29, the n-th battery is excluded from the objects for which the charge power command values Pi are calculated on the basis of the SOCs. Then, in step S24, the supply power Pit is allocated to the batteries remained after exclusion of the n-th battery, on the basis of the SOCs of the remaining batteries to thereby newly calculate the charge power command values Pi.

The processing in step S21 corresponds to a target power acquiring means (section), the processing in step S22 corresponds to a residual capacity acquiring means (section), the processing in step S23 corresponds to an upper limit power setting means (section), the processing in step S24 corresponds to a first target power allocating means (section), and the processing in step S25 corresponds to a determining means (section). Further, the processing in steps S27 to S29 and the processing after step S25 correspond to a second target power allocating means (section).

In the description provided below, the advantageous effects of the present embodiment are discussed.

According to the configuration described above, the target powers Pot, Pit are essentially allocated on the basis of the mutual rate of the SOCs of the batteries 12a to 12c to thereby set the charge/discharge power command values Po, Pi for each of the batteries 12a to 12c. Therefore, at the time of discharge of the batteries 12a to 12c, the powers of the batteries 12a to 12c can be used according to the SOCs of the respective batteries. This can avoid a situation where discharge of any one of the batteries 12a to 12c is disabled earlier than other batteries. Also, at the time of charge of the batteries 12a to 12c, power can be charged to the batteries 12a to 12c according to the SOCs of the respective batteries.

This can avoid a situation where any one of the batteries 12a to 12c is overcharged, or fully charged earlier than other batteries.

When any one of the charge/discharge power command values Po, Pi allocated to the respective batteries 12a to 12c on the basis of the SOCs exceeds corresponding one of the upper limit powers Pom, Pim of the batteries 12a to 12c, the target powers Pot, Pit are reallocated to the batteries 12a to 12c so as not to exceed the upper limit powers Pom, Pim of the batteries 12a to 12c. This can eliminate such a disadvantage as allocating the charge/discharge power command values Po, Pi exceeding the upper limit powers Pom, Pim to the respective batteries 12a to 12c, and causing the total value of the power actually charged/discharged in the batteries 12a to 12c to be smaller the target powers Pot, Pit.

In the present embodiment, if the charge/discharge power command values Po, Pi allocated on the basis of the SOC exceed the upper limit powers Pom, Pim in any one of the batteries 12a to 12c, the upper limit powers Pom, Pim of the battery in question are reset as the charge/discharge power command values Po, Pi. Then, the request power Pot and the supply power Pit are newly allocated to the remaining batteries 12a to 12c on the basis of the SOCs of the remaining batteries. Such a configuration enables discharge of power according to the request power Pot, and also enables charge of power according to the supply power Pit. At the same time, the opportunities of charge/discharge of the batteries 12a to 12c can be equalized.

The upper limit powers Pom, Pim vary according to the residual capacities of the batteries 12a to 12c, and the temperatures of the batteries 12a to 12c and the power converters 13a to 13c. Therefore, even when the charge/discharge power command values Po, Pi are set to values not more than the respective upper limit powers Pom, Pim, there is a concern that variation in the upper limit values Pom, Pim may cause the charge/discharge power command values Po, Pi to exceed the respective upper limit powers Pom, Pim. In this regard, by ensuring the upper limit powers Pom, Pim to be periodically set, the charge/discharge power command values Po, Pi can be favorably set so as to be equal to or smaller than the respective upper limit powers Pom, Pim.

Further, the request power Pot of the electrical load 25 and the supply power Pit supplied from the charge/discharge station 21 are ensured to be acquired every time the charge/discharge power command values Po, Pi are set. In this way, if the request power Pot and the supply power Pit vary, periodical acquisition of the powers Pot and Pit enables favorable setting of the charge/discharge power command values Po, Pi. In particular, when power is supplied to the electrical load 25, the request power Pot requested by the electrical load 25 varies according to the performance of the electrical load 25 or the conditions of the power sources (the commercial power source 30 and the solar power generator 26) other than the batteries 12a to 12c. Accordingly, variation is significant in the request power Pot which is requested to be supplied to the electrical load 25. For this reason, the request power Pot is ensured to be periodically acquired to enable favorable setting of the discharge power command values Po.

(Second Embodiment)

In the second embodiment, the discharge power instruction process of the first embodiment illustrated in FIG. 2 is changed to the discharge power instruction process as shown in the flow diagram illustrated in FIG. 4.

In the second embodiment, as well as in other embodiments subsequently described, description is omitted regarding the processing similar to the ones shown in the flow diagrams of the first embodiment, but is focused on what are different.

In step S15, if it is determined that the discharge power command value Po set in step S14 exceeds the upper limit discharge power Pom in any one of the batteries (NO in step S15), the control proceeds to step S31. In step S31, the discharge power command values Po(i) of the batteries are again calculated on the basis of the upper limit discharge powers Pom(i) of the batteries. Specifically, the sum (ΣPom(i)) of the upper limit discharge powers Pom(i) of the batteries 12a to 12c is calculated, and the upper limit discharge power Pom(i) of each of the batteries 12a to 12c is divided by the sum ΣPom(i). The division value is multiplied by the request power Pot, and the multiplied value is obtained as the discharge power command value Po(i) (Po(i)=Pot×Pom(i)/ΣPom(i)).

In the present embodiment, the charge power instruction process of the first embodiment shown in the flow diagram illustrated in FIG. 3 is changed to the discharge power instruction process shown in the flow diagram illustrated in FIG. 5.

In step S25, if it is determined that the charge power command value Pi set in step S24 exceeds the upper limit charge power Pim in any one of the batteries (NO in step S25), the control proceeds to step S41. In step S41, the discharge power command values Pi are calculated again on the basis of the upper limit charge powers Pim of the batteries. Specifically, the sum (ΣPim(i)) of the upper limit charge powers Pim(i) of the batteries 12a to 12c is calculated, and the upper limit charge power Pim(i) of each of the batteries 12a to 12c is divided by the sum ΣPim(i). The division value is multiplied by the supply power Pit, and the multiplied value is obtained as the charge power command value Pi(i) (Pi(i)=Pit×Pim(i)/ΣPim(i)).

There is a concern that, when the upper limit powers Pom, Pim, which are upper limit values of the charge/discharge powers, are outputted from the batteries 12a to 12c, the conversion efficiency of the power converters 13a to 13c is lowered. Further, there is a concern that, as a result of the increase of the currents passing through the batteries 12a to 12c, to which the respective upper limit powers Pom, Pim are outputted, deterioration is advanced in the batteries 12a to 12c. To cope with this, under the condition that any one of the charge/discharge power command values Po, Pi allocated on the basis of the SOCs exceeds corresponding one of the upper limit powers Pom, Pim of the batteries 12a to 12c, the charge/discharge power command values Po, Pi are ensured to be newly allocated on the basis of the mutual rate of the upper limit powers Pom, Pim of the batteries 12a to 12c. With this configuration, the charge/discharge power command values Pi, Po of each of the batteries 12a to 12b are prevented from becoming equal to the upper limit power Pom, Pim. This can eliminate such a disadvantage as lowering the conversion efficiency of the power converters 13a to 13c, or advancing deterioration of a specific one of the batteries 12a to 12c.

Further, the upper limit powers Pom, Pim of the batteries 12a to 12c are ensured to be periodically set. The upper limit discharge powers Pom of the batteries 12a to 12c increase as the SOCs increase, while the upper limit charge powers Pim increase as the SOCs decrease. Therefore, in the present embodiment as well in which the target power Pot, Pit is allocated on the basis of the upper limit powers Pom, Pim, the discharge power command values Po of the batteries having larger SOCs are set to larger values, while the charge power command values Pi of the batteries having smaller SOCs are set to larger values. As a result, when a state of discharge is kept, the SOCs of the batteries 12*a* to 12*c* concurrently turn to 0%. Also, when a state of charge is kept, the SOCs of the batteries 12*a* to 12*c* concurrently turn to 100%.

(Other Embodiments)

In reallocating the charge/discharge power command values Po, Pi when any one of the charge/discharge power command values Po, Pi that have been allocated on the basis of the SOCs exceeds corresponding one of the upper limit powers Pom, Pim, it may be so configured that the target powers Pot, Poi are equally divided by the number of the batteries for reallocation to each of the batteries 12*a* to 12*c*.

In the foregoing embodiments, the individual batteries 12*a* to 12*c* are each ensured to have an equal full-charge capacity. Specifically, in the configuration described above, the SOCs of the batteries 12*a* to 12*c* are regarded to be residual capacities and the charge/discharge power command values Po, Pi are set on the basis of the SOCs. Alternatively to this, in a modification, the residual capacities of the respective batteries 12*a* to 12*c* may be acquired and the charge/discharge power command values Po, Pi may be set on the basis of the residual capacities.

In the foregoing embodiments, of the control units 11*a* to 11*c*, the control unit of the vehicle 10*a* firstly connected to the charge/discharge station 21 is ensured to be determined to be a master. Alternatively to this, for example, the control unit serving as a master of the control units 11*a* to 11*c* of the vehicles 10*a* to 10*c* may be determined to be the one whose residual capacity is the largest among the batteries 12*a* to 12*c*. Alternatively, a master of the control units 11*a* to 11*c* may be determined in advance.

The charge power instruction process and the discharge power instruction process may be performed by the control unit 23.

The storage devices are not limited to in-vehicle batteries. For example, the storage devices may be applied to the batteries established for use in a residential house. For example, when vehicles are connected to the charge/discharge station 21 under the condition that the batteries established for use in a residential house are connected to the distribution board 24, command values for the amounts of charge/discharge may be set in association with the batteries established for use in a residential house, and the in-vehicle batteries. In this case, the in-vehicle batteries correspond to the "plurality of storage devices" and also the batteries established for use in a residential house correspond to the "plurality of storage devices". Further, when a plurality of batteries established for use in a residential house are connected to the distribution board 24, the control units of the batteries established for use in a residential house may be ensured to set command values for the amounts of charge/discharge of the individual batteries. In this case, the batteries established for use in a residential house correspond to the "plurality of storage devices".

The power system may perform either one of the charge power instruction process and the discharge power instruction process.

The power converters of the respective vehicles may each have a function as a two-way AC/DC converter, in addition to the function as a two-way DC/DC converter.

The request power Pot, the supply power Pit and the upper limit powers Pom, Pim may be fixed values. Further, having once acquired, the request power Pot, the supply power Pit and the upper limit powers Pom, Pim do not have to be necessarily updated.

Hereinafter, aspects of the above-described embodiments will be summarized.

The embodiment provides a power supply system, including: a plurality of storage devices (12*a* to 12*c*) which are connected in parallel to at least one of a common object (25) to be supplied with power and a common charging apparatus (21); and a control unit (11*a*) which has at least one of a discharge control function for controlling discharge of power from the storage devices to the object, and a charge control function for controlling charge of power from the charging apparatus to the storage devices. For the storage devices, respective upper limit powers are determined which are upper limit values of charge/discharge power. The control unit includes: a target power acquiring section which acquires power requested by the object or power supplied by the charging apparatus as target power of charge/discharge performed by the storage devices; a residual capacity acquiring section which acquires residual capacities of the storage devices; a first target power allocating section which allocates the target power to the respective storage devices as charge/discharge powers on the basis of the residual capacities of the storage devices; a determining section which determines whether or not the charge/discharge powers allocated by the first target power allocating section to the respective storage devices exceed the upper limit powers of the storage devices; and a second target power allocating section which reallocates the target power to the respective storage devices so that the charge/discharge powers allocated by the first target power allocating section to the respective storage devices do not exceed the upper limit powers, when the determining section determines that any of the charge/discharge powers allocated by the first target power allocating section to the respective storage devices has exceeded the upper limit power of the storage device related to the any of the charge/discharge powers.

According to the configuration described above, the target power (the power requested by the object to be supplied with power, or the power supplied by the charging apparatus) is essentially allocated, as charge/discharge power, to each of the storage devices on the basis of the residual capacities of the respective storage devices. Therefore, at the time of discharge of the storage devices, the powers of the storage devices can be used according to the SOCs of the respective storage devices. This can avoid a situation where discharge of any one of the storage devices is disabled earlier than other storage devices. Also, at the time of charge of the storage devices, the power can be charged to the storage devices according to the SOCs of the respective storage devices. This can avoid a situation where any one of the storage devices is overcharged, or fully charged earlier than other storage devices.

When the charge/discharge powers allocated to the storage devices on the basis of the residual capacities exceed the upper limit powers of the storage devices, the target power is reallocated as charge/discharge power to the storage devices so as not to exceed the upper limit powers of the respective storage devices. This can eliminate such a disadvantage as allocating the charge/discharge powers exceeding the upper limit powers to the respective storage devices, and causing the total value of the power actually charged/discharged in the storage devices to be lower than the target power. In this way, according to the embodiment, charge or discharge can be favorably performed in a plurality of storage devices connected in parallel with each other.

It will be appreciated that the present invention is not limited to the configurations described above, but any and all modifications, variations or equivalents, which may occur to those who are skilled in the art, should be considered to fall within the scope of the present invention.

What is claimed is:

1. A power supply system, comprising:

a plurality of storage devices which are connected in parallel to at least one of a common object to be supplied with power and a common charging apparatus; and a control unit which has at least one of a discharge control function for controlling discharge of power from the storage devices to the object, and a charge control function for controlling charge of power from the charging apparatus to the storage devices, wherein for the storage devices, respective upper limit powers are determined which are upper limit values of charge/discharge power, the control unit includes:

a target power acquiring section which acquires power requested by the object or power supplied by the charging apparatus as target power of charge/discharge performed by the storage devices;

a residual capacity acquiring section which acquires residual capacities of the storage devices;

a first target power allocating section which allocates the target power to the respective storage devices as charge/discharge powers on the basis of the residual capacities of the storage devices;

a determining section which determines whether or not the charge/discharge powers allocated by the first target power allocating section to the respective storage devices exceed the upper limit powers of the storage devices; and a second target power allocating section which reallocates the target power to the respective storage devices so that the charge/discharge powers allocated by the first target power allocating section to the respective storage devices do not exceed the upper limit powers, when the determining section determines that any of the charge/discharge powers allocated by the first target power allocating section to the respective storage devices has exceeded the upper limit power of the storage device related to the any of the charge/discharge powers, wherein when the determining section determines that any of the charge/discharge powers allocated by the first target power allocating section to the respective storage devices has exceeded the upper limit power of the storage device related to the any of the charge/discharge powers, the second target power allocating section reallocates the target power to the storage devices as charge/discharge powers on the basis of a mutual rate of the upper limit powers.

2. The power supply system according to claim 1, wherein the control unit includes an upper limit power setting section which sets the upper limit powers of the respective storage devices at predetermined periods.

* * * * *